United States Patent
Yu et al.

(10) Patent No.: US 7,356,380 B2
(45) Date of Patent: Apr. 8, 2008

(54) PROCESS CONTROL METHOD

(75) Inventors: Shing-Sheng Yu, Hsinchu (TW); Chih-Ming Ke, Hsinchu (TW); Burn Jeng Lin, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 570 days.

(21) Appl. No.: 11/027,412

(22) Filed: Dec. 30, 2004

(65) Prior Publication Data

US 2006/0196960 A1    Sep. 7, 2006

(51) Int. Cl.
   *G06F 19/00*    (2006.01)
(52) U.S. Cl. ........................ 700/121; 700/299
(58) Field of Classification Search .............. 700/110, 700/121, 299
   See application file for complete search history.

(56) References Cited

U.S. PATENT DOCUMENTS

| | | | |
|---|---|---|---|
| 6,566,016 B1* | 5/2003 | Ziger | 430/5 |
| 6,590,219 B1* | 7/2003 | Ziger | 250/492.2 |
| 7,001,697 B2* | 2/2006 | Park et al. | 430/5 |
| 2003/0157415 A1* | 8/2003 | Ziger | 430/5 |
| 2004/0182822 A1* | 9/2004 | Chen et al. | 216/67 |

* cited by examiner

*Primary Examiner*—Leo Picard
*Assistant Examiner*—Chad Rapp
(74) *Attorney, Agent, or Firm*—Thomas, Kayden, Horstemeyer & Risley (57) ABSTRACT

A methodology for doing process control by using a heating apparatus comprising heating zones is revealed. First, a target CD (critical dimension) map is assigned. A baseline CD map corresponding to a substrate processed with the heating apparatus at a baseline setting is also obtained. An original CD map corresponding to a substrate processed at an original setting is obtained. For each heating zone, a perturbed CD map corresponding to a substrate processed at a perturbed setting is also obtained. The temperature distribution of the heating apparatus is adjusted according to the error CD map defined by the baseline CD map and the target CD map, basis functions defined by the original CD map and perturbed CD maps, and expansion coefficients expanding the error CD map with basis functions.

25 Claims, 6 Drawing Sheets

PROCESS CONTROL METHOD

BACKGROUND

The invention relates to process control, and particularly to methodology that reduces CD (Critical Dimension) non-uniformity in resist processing for semiconductor mask or wafer manufacturing, and compensates interfield signature from other processes.

Figure 1:
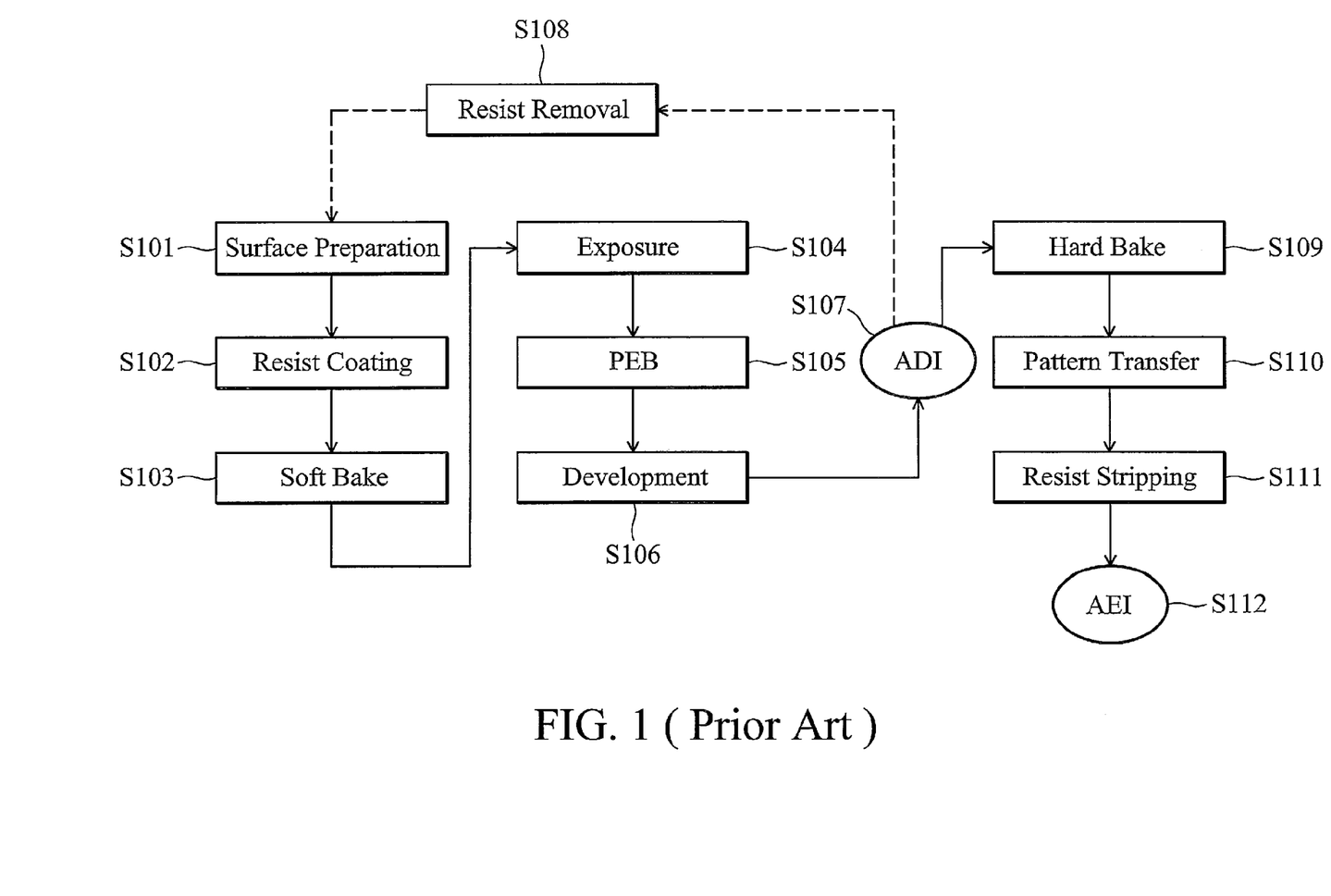
FIG. 1 is flowchart showing a basic lithography flow.

FIG. 1 shows a basic lithography flow. First, a wafer is prepared, and the wafer surface is cleaned (S101). Then, a thin layer of resist (photoresist) is spin coated on the wafer surface (S102). In soft bake, resist solvent is partially removed by using a heating device, such as a hot plate (S103). Then, at least one mask is aligned to the wafer, and resist on the wafer is exposed, resulting in an acid latent image (S104). In PEB (Post-Exposure Bake), a chemical reaction is thermally induced. This, being catalyzed by the acid, may be the activation of a crosslinking agent for a negative resist or the deblocking of the polymer resin for a positive resist (S105). In development, the resist that is not crosslinked or is deblocked is removed (S106). Then, in ADI (After Development Inspection), CD of the resist pattern is inspected using a SEM (Scanning Electron Microscope) to determine whether it conforms to the specification (S207). If not, the resist is removed and the whole procedure is reworked (S108). If yes, in hard bake, more resist solvent is removed (S109). Thereafter, pattern transfer, such as etching, is performed (S110). Then, the resist layer is stripped from the wafer (S111). Finally, AEI (After Etching Inspection) is performed.

For commonly used commercialized chemically amplified resist, the PEB sensitivity is of the order of 10 nm/degree. That is, change of PEB temperature by 1 degree will result in about 10 nm change of resist CD. Thus, for application of, e.g., the 90-nm node and beyond, temperature uniformity of a hot plate is controlled to be less than 0.2°, being a big challenge for track manufacturers.

Tokyo Electronic Industry Co., Ltd (TEL) uses a RTD (Resistance Temperature Detector) wafer to calibrate their chilling precision hot plate (CPHP). Since the chamber accommodating CPHP is opened in order to place the RTD wafer, the temperature measured in such a way cannot reflect the original thermal environment that a wafer experiences during its PEB. Further, it takes a long time for the RTD wafer to complete the whole calibration procedure. Additionally, since there are 29 sensors on the RTD wafer, such characterization of a hot plate will not be detailed enough.

OnWafer Technologies proposes a wireless device that mimics a wafer with built-in thermal sensors. Thus, it can be sent into the track just like a production wafer and measures the whole thermal cycle at correct thermal environment. However, if the required accuracy is very high, matching of response between different sensors should be guaranteed. If it is uniformity of CD, rather than temperature, that is to be adjusted, then the relation between CD and the whole thermal cycle needs to be established. Also, similar to the RTD wafer, there are 42 sensors on the wireless sensor wafer, still too few to give a sufficient characterization of a hot plate. Moreover, such methodology is of high cost due to short lifetime of the wireless sensor wafer.

What is pursued here is a methodology directly utilizing resist as the thermal sensor for accurate, efficient, and economical measurement of the temperature of a hot plate, so realizing process control by adjusting the hot plate, therefore improving CD uniformity.

SUMMARY

Accordingly, a heating apparatus/system and a process control method for use in the heating apparatus/system are provided. A baseline CD map W is first obtained by measuring CD at predetermined locations within a substrate processed with the heating apparatus at a baseline setting. A target CD map M is also obtained by assigning CD value at each of the predetermined locations within a substrate. An error CD map $\Delta W$ is then calculated by subtracting CD value of the target CD map from that of the baseline CD map at each of the predetermined locations within a substrate. An original CD map N is obtained by measuring CD at the predetermined locations within a substrate processed with the heating apparatus at an original setting. A perturbed CD map $W^i$ for each heating zone i is also obtained by measuring CD at predetermined locations within a substrate processed with the heating apparatus at a setting where the temperature of the heating zone i is deviated from the original setting by a predetermined value $\Delta T^i$. A basis function $P^i$ for each heating zone i is then calculated by subtracting CD value of the original CD map from that of the perturbed CD map at each of the predetermined locations within a substrate. Afterwards, the error CD map $\Delta W$ is expanded by a collection of the basis functions with the expansion coefficient $c^i$ for each basis function $P^i$, respectively. The baseline setting of each heating zone i of the heating apparatus is then adjusted according to the error CD map $\Delta W$, the expansion coefficient $c^i$, and the basis functions.

A substrate is then processed with the heating apparatus at the adjusted baseline setting.

The baseline setting of each heating zone i of the heating apparatus is adjusted by an amount $-c^i \Delta T^i$.

The expansion coefficient $c^i$ is obtained by using a least-square-fitting method.

The CD of the baseline CD map is based on an after-development or after-etching image.

The CD of the original CD map and the perturbed CD map is based on an after-development or after-etching image.

The interfield signature of prior processes, e.g., CVD (Chemical Vapor Deposition), CMP (Chemical Mechanical Polishing), can also be compensated as long as it is consistent from run to run.

A semiconductor fabrication method incorporating a heating apparatus is also provided. An exposed photoresist on a substrate is heated with the heating apparatus at a baseline setting, and is further processed to delineate a collection of patterns at predetermined locations. CD of the collection of patterns is measured to obtain a baseline CD map W. CD value at each of the predetermined locations is assigned to generate a target CD map M. Then, temperature distribution of the heating apparatus is adjusted according to an error CD map $\Delta W$ defined as the difference between the baseline CD map W and the target CD map M.

An exposed photoresist on a substrate is heated with the heating apparatus at an original setting, and is further processed to delineate a collection of patterns at the predetermined locations. CD at the predetermined locations on the substrate is measured to obtain an original CD map N. An exposed photoresist on a substrate is heated with the heating apparatus at a setting where the temperature of the heating zone i is deviated from the original setting by a predetermined value $\Delta T^i$, and is further processed to delineate a collection of patterns at the predetermined locations. CD at the predetermined locations on the substrate is measured to obtain a perturbed CD map $W^i$ for the heating zone i of the heating apparatus. Then, a basis function $P^i$ for the heating zone i is calculated by subtracting CD value of the original CD map from that of the perturbed CD map at each of the predetermined locations within a substrate. Repeat the above procedure until the basis function $P^i$ for each heating zone i is obtained. The error CD map $\Delta W$ is then expanded by a collection of the basis functions with a corresponding expansion coefficient $c^i$ for each basis function $P^i$. The baseline setting of each heating zone i of the heating apparatus is adjusted according to the error CD map $\Delta W$, the expansion coefficient $c^i$, and the basis functions.

A substrate is then processed in semiconductor mask or wafer manufacturing with the heating apparatus at the adjusted baseline setting.

The baseline setting of each heating zone i of the heating apparatus is adjusted by an amount $-c^i \Delta T^i$.

The expansion coefficient $c^i$ is obtained by using a least-square-fitting method.

The CD is based on an after-development or after-etching image.

The interfield signature of prior processes, e.g., CVD, CMP, can also be compensated as long as it is consistent from run to run.

The aforementioned methodology may take the form of program code embodied in a tangible media. When the program code is loaded into and executed by a machine, the machine can become an apparatus for practicing the disclosed methodology.

BRIEF DESCRIPTION OF THE DRAWINGS

The aforementioned features and advantages will become apparent by referring to the following detailed description with reference to the accompanying drawings, wherein.

DESCRIPTION

Figure 2A:
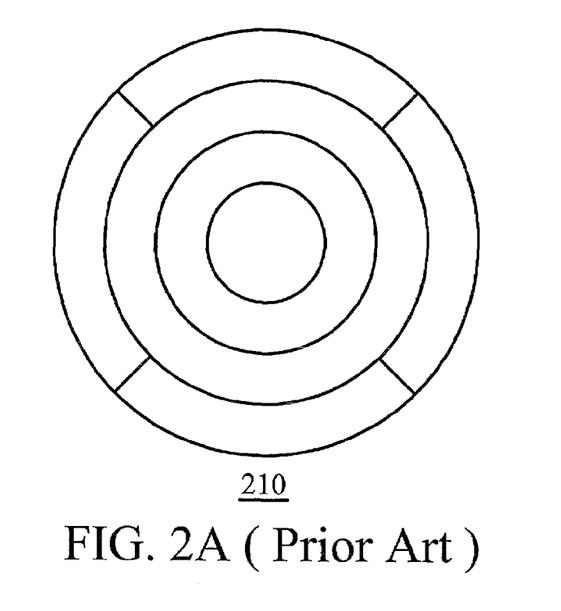
FIG. 2A is a schematic diagram illustrating a hot plate consisting of 7 heating zones.
Figure 2B:
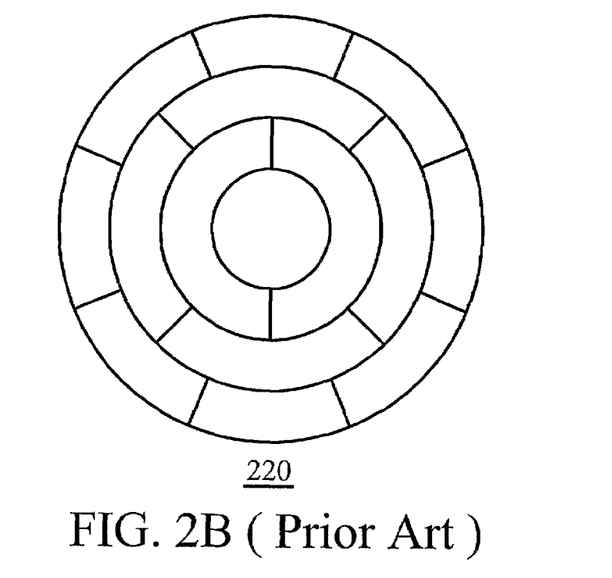
FIG. 2B is a schematic diagram illustrating a hot plate consisting of 15 heating zones.

Though one knows that CDU is not good, also that such non-uniformity is mainly from temperature non-uniformity of a heating apparatus, such as a hot plate, for PEB, one cannot adjust the temperature distribution of the hot plate at his will. There are, e.g., for TEL's track, 7 or 15 degrees of freedom, corresponding to 7 or 15 heating zones of the hot plate (210 and 220), as illustrated in FIG. 2A and FIG. 2B, respectively. The purpose of this invention is to provide a methodology to realize best CD uniformity under such limited degrees of freedom. It is understood that the methodology of this invention is equally applicable for any chosen number of heating zones and the shapes and locations thereof.

Figure 3:
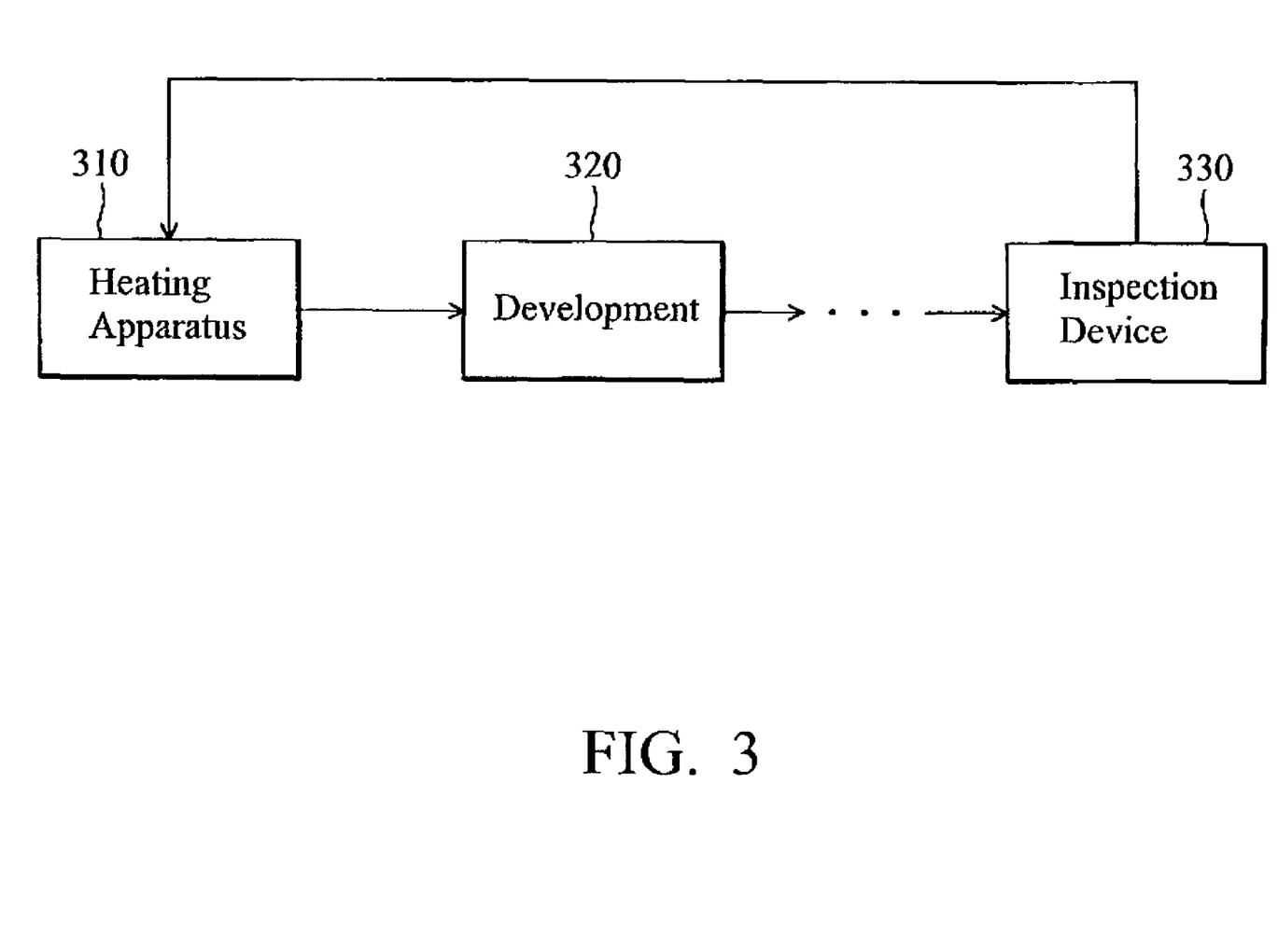
FIG. 3 is a schematic diagram illustrating the architecture for process control according to an embodiment of the invention.

FIG. 3 is a schematic diagram illustrating the architecture of process control according to an embodiment of the invention. The architecture comprises a heating apparatus 310, such as a hot plate, at least one process stage of development 320, and an inspection device 330. The heating apparatus 310 comprises a plurality of heating zones. The process stages may also comprise hard bake and pattern transfer, e.g., etching comprising ion implantation, thin film deposition, and etching stages. The inspection device 330 maybe used for CD inspection in an inspection stage, such as ADI, AEI. The inspection result can be fed back to adjust temperature distribution of the heating apparatus 310.

Figure 4:
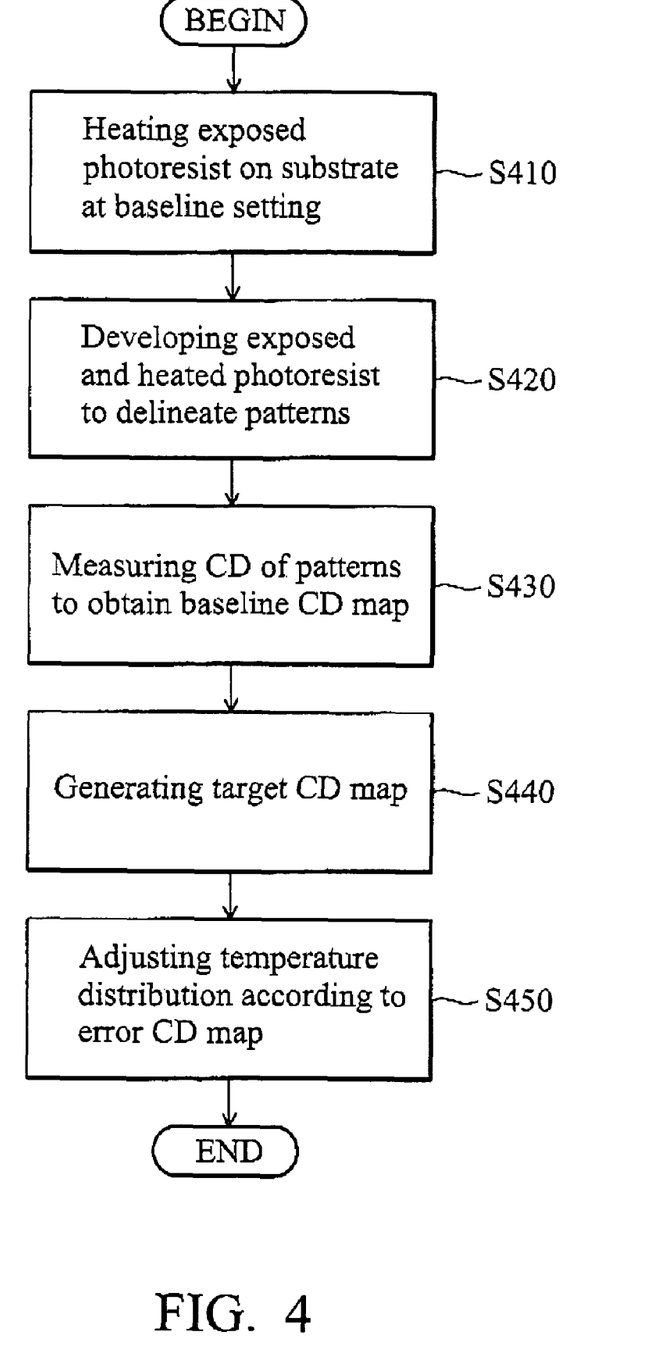
FIG. 4 is a flowchart showing a method of semiconductor fabrication according to an embodiment of the invention.

FIG. 4 is a flowchart showing a method of semiconductor fabrication according to an embodiment of the invention.

First, in step S410, an exposed photoresist on a substrate, such as a wafer, is heated on the heating apparatus 310 at a baseline setting. In step S420, the exposed and heated photoresist is then developed, or further processed, to delineate a collection of patterns at predetermined locations of the substrate. Then, in step S430, CD of the collection of patterns is measured to obtain a baseline CD map W. In step S440, CD value at each of the predetermined locations is assigned to generate a target CD map M. Thereafter, in step S450, temperature distribution of the heating apparatus 310 is adjusted according to an error CD map $\Delta W$ defined as the difference between the baseline CD map W and the target CD map M. The heating apparatus 310 with the adjusted baseline setting (temperature distribution) can be used for processing subsequent substrates in semiconductor mask or wafer manufacturing. Detailed descriptions of the adjustment follow.

Figure 5:
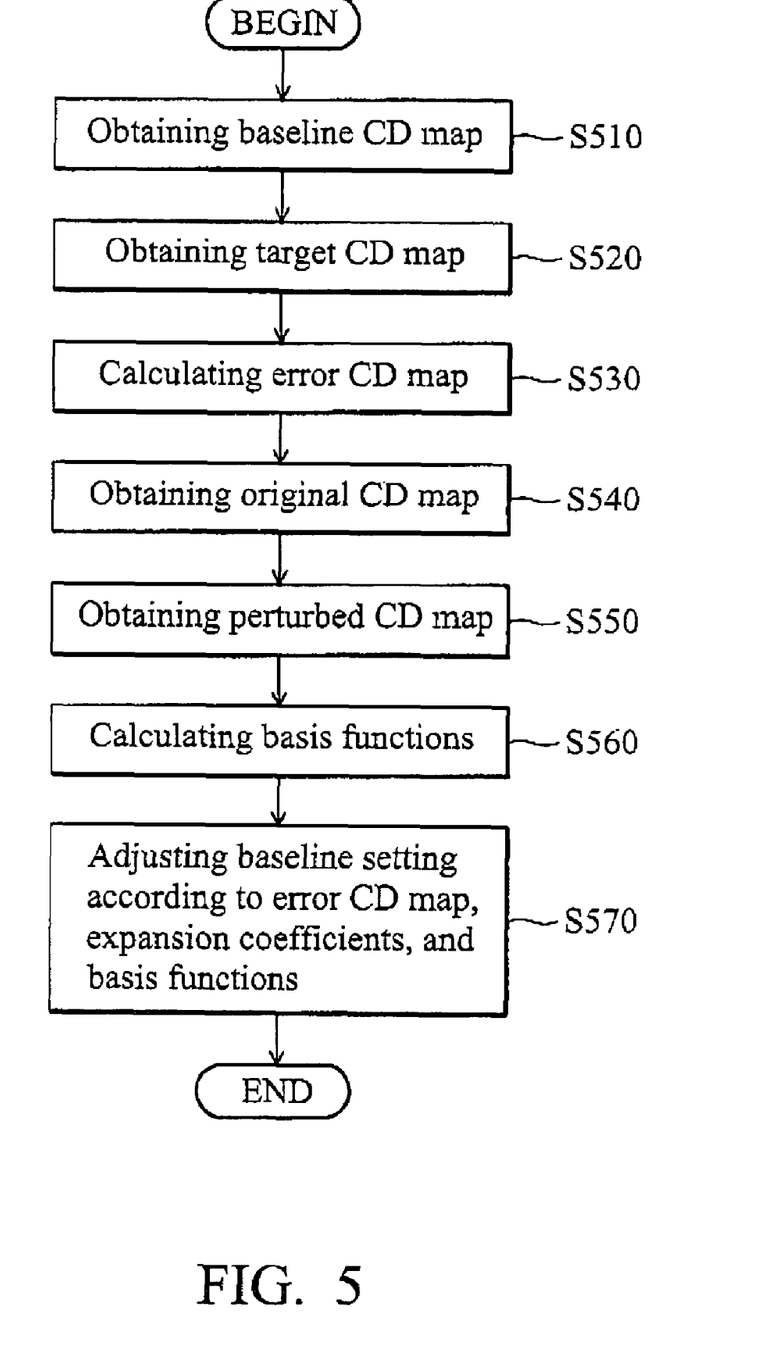
FIG. 5 is a flowchart showing a method of process control according to an embodiment of the invention.

FIG. 5 is a flowchart showing a method of process control according to an embodiment of the invention.

In step S510, a baseline CD map W is first obtained by measuring CD at predetermined locations within a substrate, such as a wafer, processed with the heating apparatus 310 at a baseline setting. In step S520, a target CD map M is also obtained by assigning CD value at each of the predetermined locations within a substrate. In step S530, an error CD map $\Delta W$ is then calculated by subtracting CD value of the target CD map from that of the baseline CD map at each of the predetermined locations within a substrate, i.e., $\Delta W = W - M$. More explicitly $\Delta W_j = W_j - M_j$ at each location j.

In step S540, an original CD map N is obtained by measuring CD at the predetermined locations within a substrate processed with the heating apparatus at an original setting. In step S550, a perturbed CD map $W^i$ for each heating zone i is obtained by measuring CD at the predetermined locations within a substrate processed with the heating apparatus at a setting where the temperature of the heating zone i is deviated from the original setting by a predetermined value $\Delta T^i$. It is understood that the original CD map corresponding to the original setting may be identical to the baseline CD map corresponding to the baseline setting. How worse the CD non-uniformity of the baseline CD map is determines how large $\Delta T^i$ should be used. If $\Delta T^i$ is too small, extrapolation will have to be employed in the subsequent fitting procedure, making it less precise, while if $\Delta T^i$ is too large, nonlinear effect will occur. In step S560, a basis function $P^i$ for each heating zone i is then calculated by subtracting CD value of the original CD map N from that of the perturbed CD map $W^i$ at each of the predetermined locations within the substrate, i.e., $P^i = W^i - N$. More explicitly, $P_j^i = W_j^i - N_j$ at each location j. The operation of step S560 is repeated for each heating zone of the heating apparatus 310 until all basis functions are obtained.

Thereafter, in step S570, the baseline setting (temperature distribution) of each heating zone i of the heating apparatus 310 is adjusted according to the error CD map $\Delta W$, the expansion coefficient $c^i$, and the basis functions. In step S570, the error CD map $\Delta W$ is expanded by a collection of the basis functions with a corresponding expansion coefficient $c^i$ for each basis function $P^i$, i.e., $$\Delta W = \sum_i c^i P^i.$$

The coefficient $c^i$ can be found by minimizing the total error $$\sum_j \left[ \Delta W_j - \sum_i c^i P^i_j \right]^2$$

by using a least-square-fitting method. The method can be found in standard textbooks on numerical analysis, and is thus omitted here. Therefore, if the baseline setting of each heating zone i of the heating apparatus 310 is adjusted by $-c^i \Delta T^i$, then the baseline CD map will theoretically improve $$\text{to } W^c = W - \sum_i c^i P^i.$$

It is understood that W, M, $\Delta W$, $W^i$, N, $P^i$, and $W^c$ are all scalar fields, i.e., a collection of a scalar value at each of the predetermined locations on a substrate.

The process control describe above, initially intended to be used at the ADI stage, can be extended to improve the CD uniformity at the AEI stage. This corresponds to compensate the etching chamber characteristics by PEB by adjusting the temperature profile of the heating apparatus (hot plate). The change represented by the procedures is that CD is measured at the AEI stage. Further, any interfield signature of prior processes, e.g., CVD, CMP, is also corrected implicitly if the substrate already undergoes these prior processes.

Figure 6:
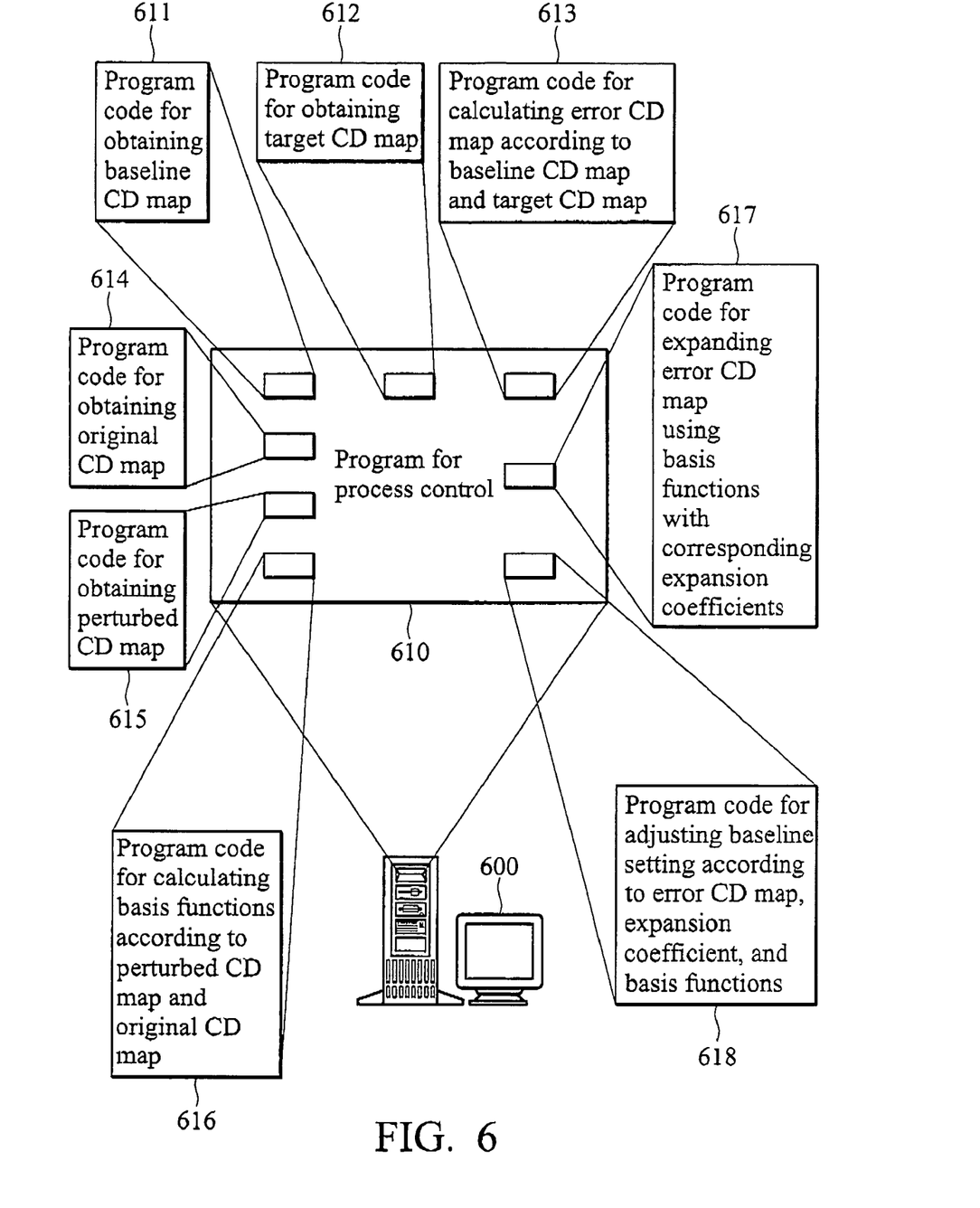
FIG. 6 is a schematic diagram illustrating a storage medium storing a computer program for executing a process control method according to an embodiment of the invention.

FIG. 6 is a diagram showing a hardware and software system, capable of controlling lithography tools, e.g., track, scanner, etcher, for doing automatic process control according to an embodiment of the present invention. The system comprises a storage medium 610 storing computer readable program code to be used in a computer system 600. The computer readable program code comprises at least computer readable program code 611 obtaining a baseline CD map W by measuring CD at predetermined locations within a substrate processed with a heating apparatus comprising a plurality of heating zones at a baseline setting, computer readable program code 612 obtaining a target CD map M by assigning CD value at each of the predetermined locations within a substrate, computer readable program code 613 to calculate an error CD map $\Delta W$ by subtracting CD value of the target CD map from that of the baseline CD map at each of the predetermined locations within a substrate, computer readable program code 614 obtaining an original CD map N by measuring CD at the predetermined locations within a substrate processed with the heating apparatus at an original setting, computer readable program code 615 obtaining a perturbed CD map $W^i$ for each heating zone i by measuring CD at the predetermined locations within a substrate processed with the heating apparatus at a setting that the temperature of the heating zone i is deviated from the original setting by a predetermined value $\Delta T^i$, computer readable program code 616 calculating a basis function $P^i$ for each heating zone i by subtracting CD value of the original CD map from that of the perturbed CD map at each of the predetermined locations within a substrate, computer readable program code 617 expanding the error CD map $\Delta W$ by a collection of the basis functions with a corresponding expansion coefficient $c^i$ for each basis function $P^i$, and computer readable program code 618 adjusting the baseline setting of each heating zone i of the heating apparatus according to the error CD map $\Delta W$, the expansion coefficient $c^i$, and the basis functions.

Embodiments of the method and system, or certain aspects or portions thereof, may take the form of program code (i.e., executable instructions) embodied in tangible media, such as floppy diskettes, CD-ROMs, hard drives, or any other machine-readable storage medium, wherein, when the program code is loaded into and executed by a machine, such as a computer, the machine thereby becomes an apparatus for practicing the embodiment. Embodiments of the method and system may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the embodiments. When implemented on a general-purpose processor, the program code combines with the processor to provide a unique apparatus that operates analogously to application specific logic circuits.

Although the present invention has been described according to predefined embodiment, it is not intended to limit the invention thereto. Those skilled in this technology can still make various alterations and modifications without departing from the scope and spirit disclosed.

What is claimed is:

1. A process control method for use in a heating apparatus comprising a plurality of heating zones, the method comprising:

obtaining a baseline CD (critical dimension) map W by measuring CD at predetermined locations within a substrate processed with the heating apparatus at a baseline setting;

calculating an error CD map $\Delta W$ by subtracting CD value of a target CD map from that of the baseline CD map at each of the predetermined locations within the substrate;

obtaining a CD map $W^i$ for each heating zone i by measuring CD at the predetermined locations within the substrate processed with the heating apparatus at a setting where the temperature of the heating zone i is deviated from an original setting by a predetermined value $\Delta T^i$;

calculating a basis function $P^i$ for each heating zone i by subtracting CD value of an original CD map from that of a perturbed CD map at each of the predetermined locations within the substrate;

expanding the error CD map $\Delta W$ by a collection of the basis functions with a corresponding expansion coefficient $c^i$ for each basis function $P^i$; and adjusting the baseline setting of each heating zone i of the heating apparatus according to the error CD map $\Delta W$, the expansion coefficient $c^i$, and the basis functions.

2. The method of claim 1 further comprising adjusting the baseline setting of each heating zone i of the heating apparatus by an amount about $-c^i \Delta T^i$.

3. The method of claim 1 wherein CD is based on an after-developement or after-etching image.

4. The method of claim 1 further comprising obtaining the expansion coefficient $c^i$ using a least-square-fitting method.

5. The method of claim 1 further comprising processing a substrate with the heating apparatus at the adjusted baseline setting in semiconductor mask or wafer manufacturing.

6. The method of claim 1 further comprising obtaining the target CD map M by assigning CD value at each of the predetermined locations within a substrate.

7. The method of claim 1 further comprising obtaining the original CD map N by measuring CD at the predetermined locations within a substrate processed with the heating apparatus at the original setting.

8. A heating system comprising a plurality of heating zones, the system comprising:
   means for obtaining a baseline CD (critical dimension) map W by measuring CD at predetermined locations within a substrate processed with the heating apparatus at a baseline setting;
   means for calculating an error CD map $\Delta W$ by subtracting CD value of a target CD map from that of the baseline CD map at each of the predetermined locations within the substrate;
   means for obtaining a perturbed CD map $W^i$ for each heating zone i by measuring CD at the predetermined locations within the substrate processed with the heating apparatus at a setting where the temperature of the heating zone i is deviated from an original setting by a predetermined value $\Delta T^i$;
   means for calculating a basis function $P^i$ for each heating zone i by subtracting CD value of an original CD map from that of the perturbed CD map at each of the predetermined locations within the substrate;
   means for expanding the error CD map $\Delta W$ by a collection of the basis functions with a corresponding expansion coefficient $c^i$ for each basis function $P^i$; and
   means for adjusting the baseline setting of each heating zone i of the heating apparatus according to the error CD map $\Delta W$, the expansion coefficient $c^i$, and the basis functions.

9. The heating system of claim 8 further comprising means for adjusting the baseline setting of each heating zone i of the heating apparatus by an amount about $-c^i \Delta T^i$.

10. The heating system of claim 8 wherein CD is based on an after-developement or after-etching image.

11. The heating system of claim 8 wherein the expansion coefficient $c^i$ is obtained using a least-square-fitting method.

12. The heating system of claim 8 further comprising means for processing a substrate with the heating system at the adjusted baseline setting in semiconductor mask or wafer manufacturing.

13. The heating system of claim 8 wherein the target CD map M is obtained by assigning CD value at each of the predetermined locations within a substrate.

14. The heating system of claim 8 wherein the original CD map N is obtained by measuring CD at the predetermined locations within a substrate processed with the heating apparatus at the original setting.

15. A machine-readable storage medium storing a computer program, causing, when executed, a computer to perform a process control method, comprising:
   obtaining a baseline CD (critical dimension) map W by measuring CD at predetermined locations within a substrate processed with the heating apparatus at a baseline setting;
   calculating an error CD map $\Delta W$ by subtracting CD value of a target CD map from that of the baseline CD map at each of the predetermined locations within the substrate;
   obtaining a perturbed CD map $W^i$ for each heating zone i by measuring CD at the predetermined locations within the substrate processed with the heating apparatus at a setting where the temperature of the heating zone i is deviated from an original setting by a predetermined value $\Delta T^i$;
   calculating a basis function $P^i$ for each heating zone i by subtracting CD value of an original CD map from that of the perturbed CD map at each of the predetermined locations within the substrate;
   expanding the error CD map $\Delta W$ by a collection of the basis functions with a corresponding expansion coefficient $c^i$ for each basis function $P^i$; and
   adjusting the baseline setting of each heating zone i of the heating apparatus according to the error CD map $\Delta W$, the expansion coefficient $c^i$, and the basis functions.

16. A semiconductor fabrication method incorporating a heating apparatus, comprising:
   heating an exposed photoresist on a substrate on the heating apparatus at a baseline setting;
   developing the exposed and heated photoresist to delineate a collection of patterns at predetermined locations;
   measuring CD (critical dimension) of the collection of patterns to obtain a baseline CD map W;
   assigning CD value at each of the predetermined locations to generate a target CD map M;
   adjusting temperature distribution of the heating apparatus according to an error CD map $\Delta W$ defined as the difference between the baseline CD map W and the target CD map M;
   dividing the heating apparatus into a plurality of heating zones;
   obtaining an original CD map N by measuring CD at the predetermined locations within the substrate processed with the heating apparatus at an original setting;
   obtaining a perturbed CD map $W^i$ for each heating zone i by measuring CD at the predetermined locations within the substrate processed with the heating apparatus at a setting where the temperature of the heating zone i is deviated from the original setting by a predetermined value $\Delta T^i$;
   calculating a basis function $P^i$ for each heating zone i by subtracting CD value of the original CD map from that of the perturbed CD map at each of the predetermined locations within the substrate;
   expanding the error CD map $\Delta W$ by a collection of the basis functions with a corresponding expansion coefficient $c^i$ for each basis function $P^i$; and
   adjusting the baseline setting of each heating zone i of the heating apparatus according to the error CD map $\Delta W$, the expansion coefficient $c^i$, and the basis functions.

17. The method of claim 16 further comprising adjusting the baseline setting of each heating zone i of the heating apparatus by an amount about $-c^i \Delta T^i$.

18. The method of claim 16 further comprising obtaining the expansion coefficient $c^i$ using a least-square-fitting method.

19. The method of claim 16 wherein CD is based on an after-development or after-etching image.

20. The method of claim 16 further comprising processing a substrate by the heating apparatus at the adjusted baseline setting in semiconductor mask or wafer manufacturing.

21. A semiconductor fabrication method incorporating a heating apparatus, comprising:

heating an exposed photoresist on a substrate on the heating apparatus at a baseline setting;

developing and etching the exposed and heated photoresist to delineate a collection of patterns at predetermined locations;

measuring CD (critical dimension) of the collection of patterns to obtain a baseline CD map W;

assigning CD value at each of the predetermined locations to generate a target CD map M;

adjusting temperature distribution of the heating apparatus according to an error CD map $\Delta W$ defined as the difference between the baseline CD map W and the target CD map M;

dividing the heating apparatus into a plurality of heating zones;

obtaining an original CD map N by measuring CD at the predetermined locations within the substrate processed with the heating appparatus at an original setting;

obtaining a perturbed CD map $W^i$ for each heating zone i by measuring CD at the predetermined locations within the substrate processed with the heating apparatus at a setting where the temperature of the heating zone i is deviated from the original setting by a predetermined value $\Delta T^i$;

calculating a basis function $P^i$ for each heating zone i by subtracting CD value of the original CD map from that of the perturbed CD map at each of the predetermined locations within the substrate;

expanding the error CD map $\Delta W$ by a collection of the basis functions with a corresponding expansion coefficient $c^i$ for each basis function $P^i$; and adjusting the baseline setting of each heating zone i of the heating apparatus according to the error CD map $\Delta W$, the expansion coefficient $c^i$, and the basis functions.

22. The method of claim 21 further comprising adjusting the baseline setting of each heating zone i of the heating apparatus by an amount about $-c^i \Delta T^i$.

23. The method of claim 21 further comprising obtaining the expansion coefficient $c^i$ using a least-square-fitting method.

24. The method of claim 21 wherein CD is based on an after-developement or after-etching image.

25. The method of claim 21 further comprising processing a substrate by the heating apparatus at the adjusted baseline setting in semiconductor mask or wafer manufacturing.

* * * * *